Feb. 1, 1955
D. W. TERRY ET AL
2,700,793
PROCESS FOR CLEANING POULTRY GIZZARDS
Filed Sept. 9, 1953
7 Sheets-Sheet 1
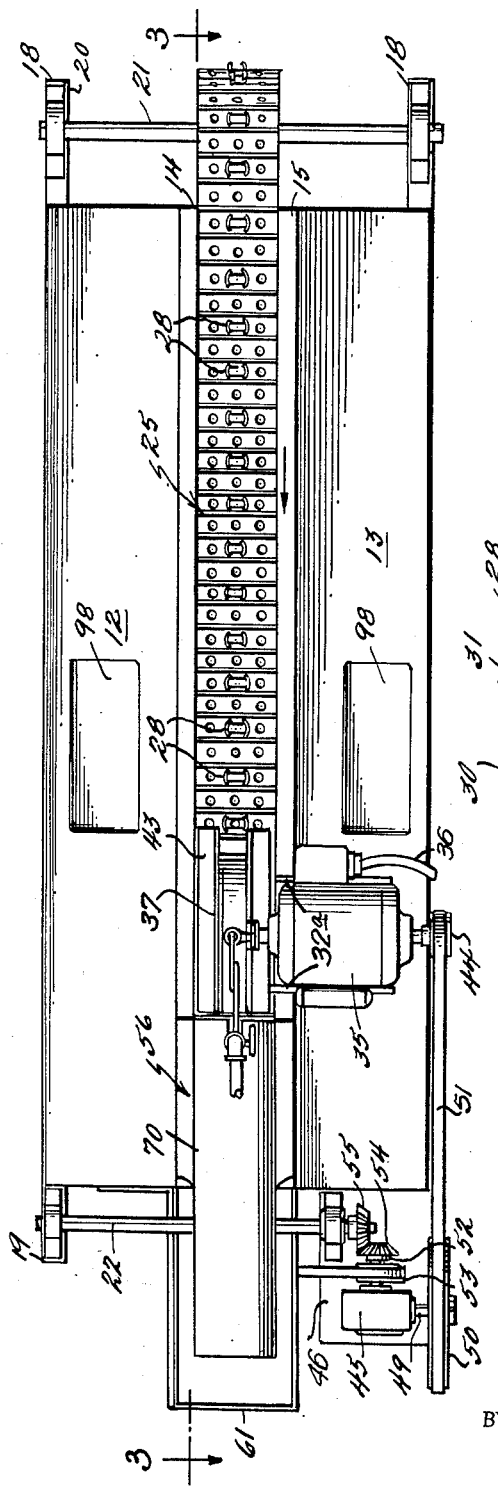
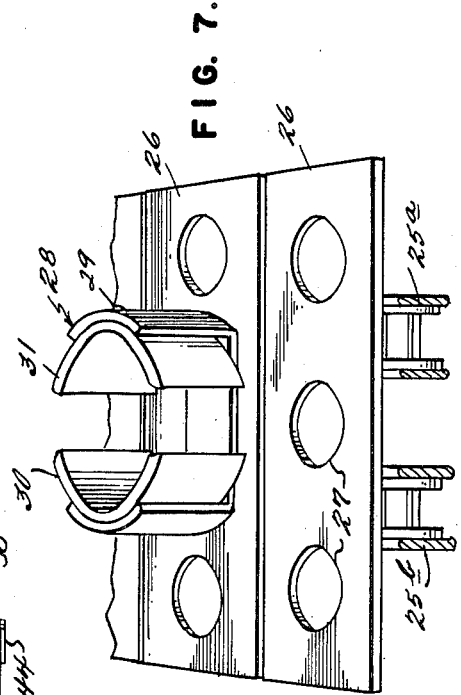
INVENTORS
**DOYLE W. TERRY
TERRELL J. MELTON**
BY
*Semmes & Semmes*
ATTORNEYS

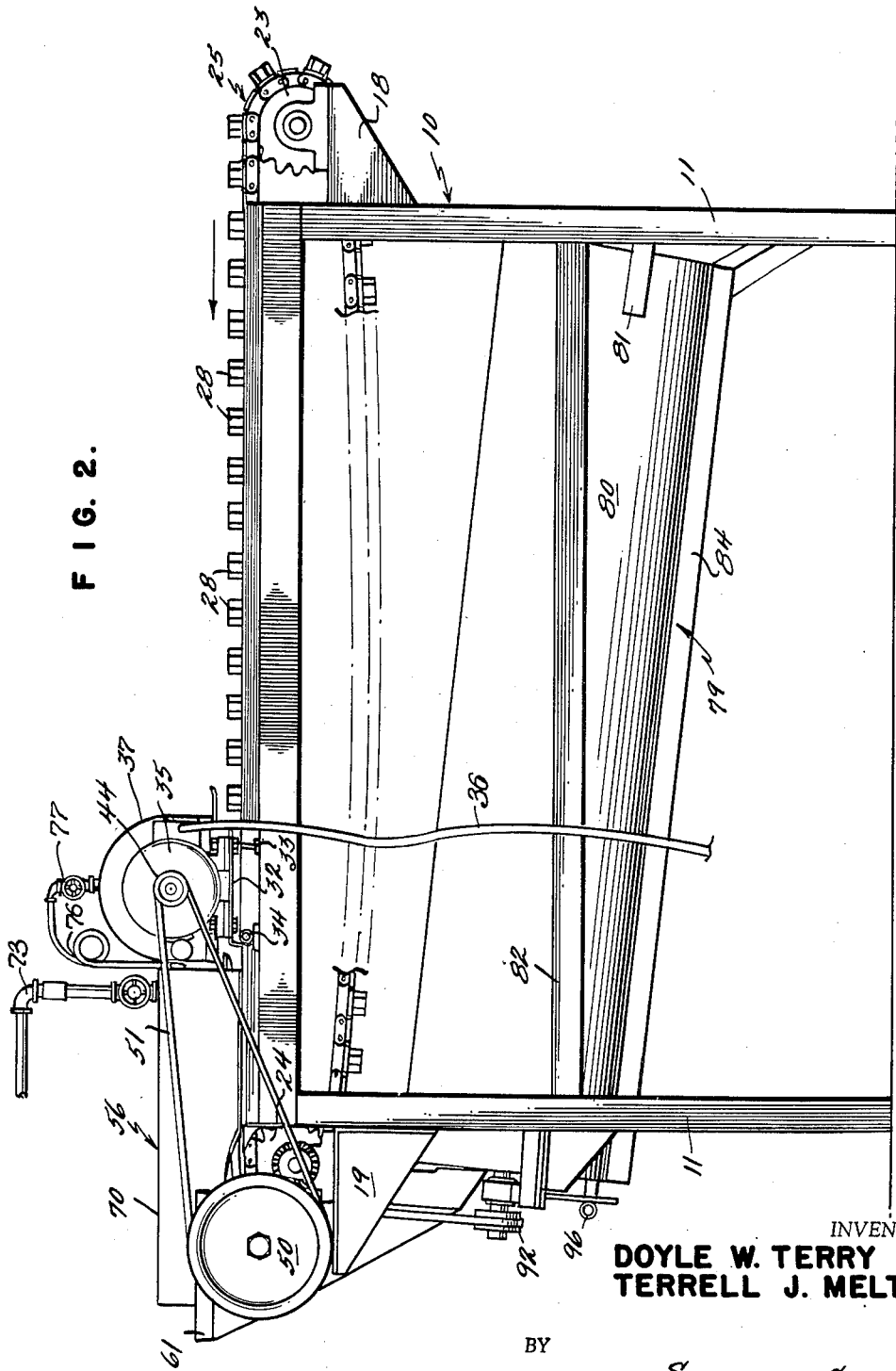

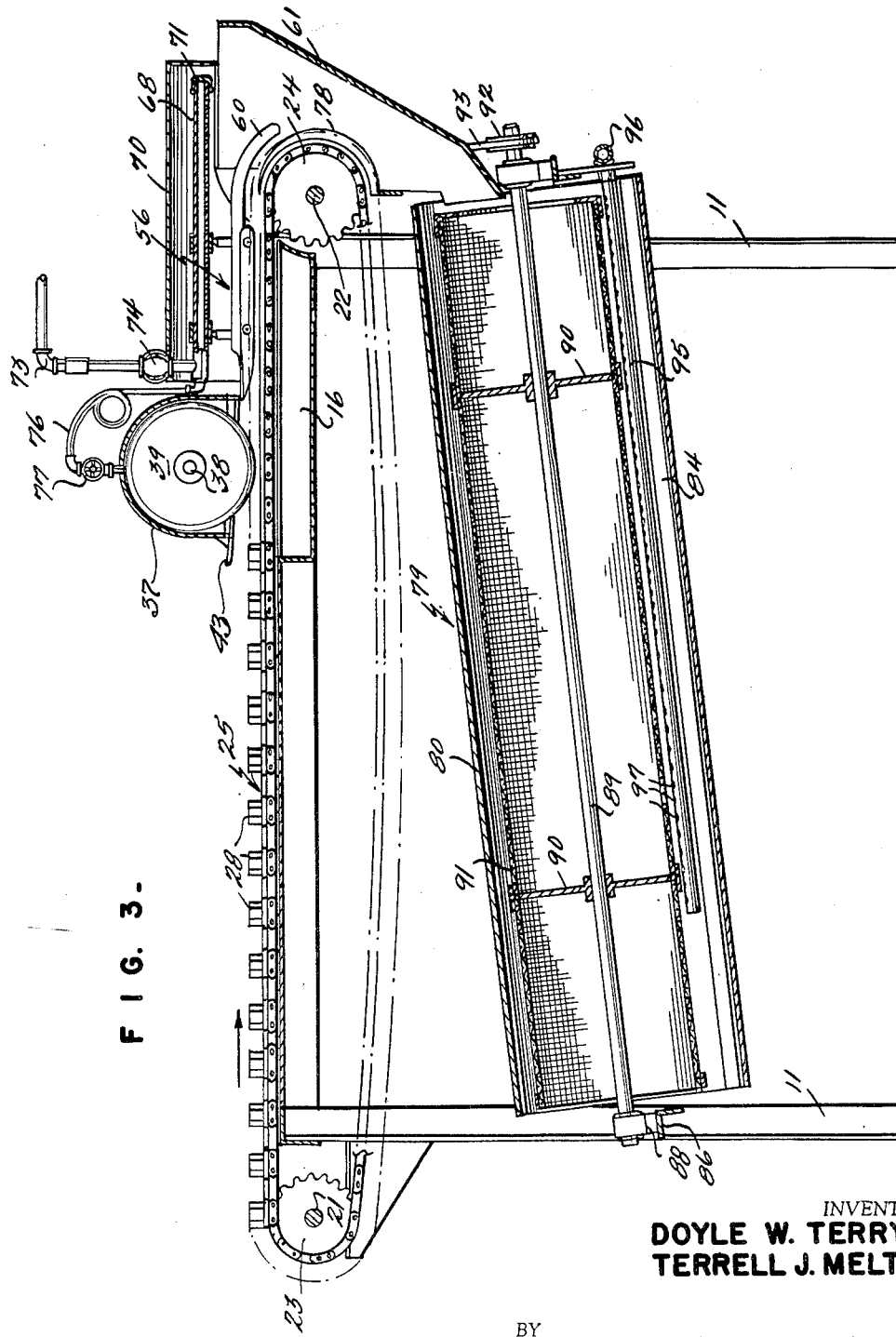

INVENTORS
DOYLE W. TERRY
TERRELL J. MELTON

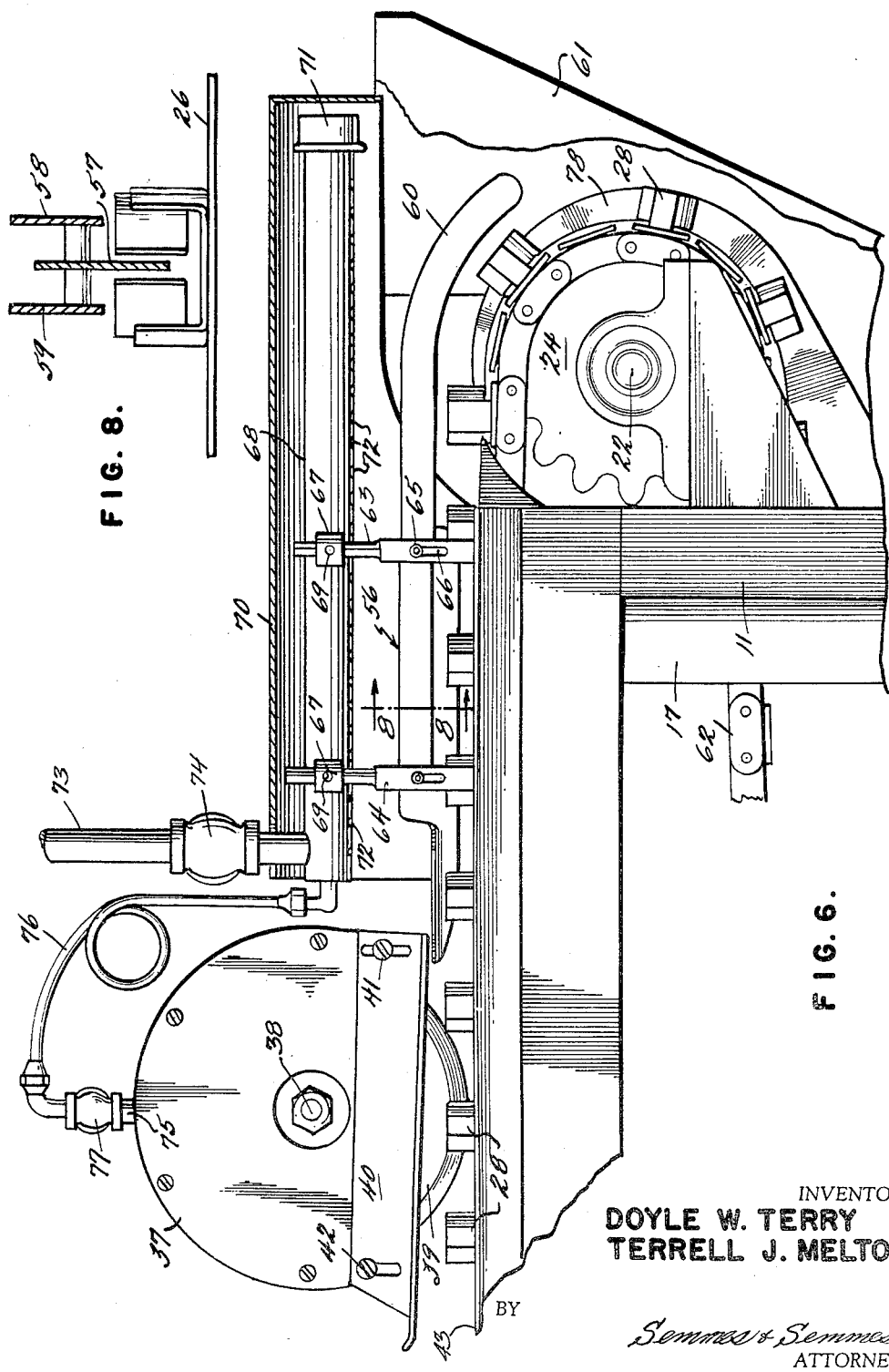

INVENTOR
DOYLE W. TERRY
TERRELL J. MELTON

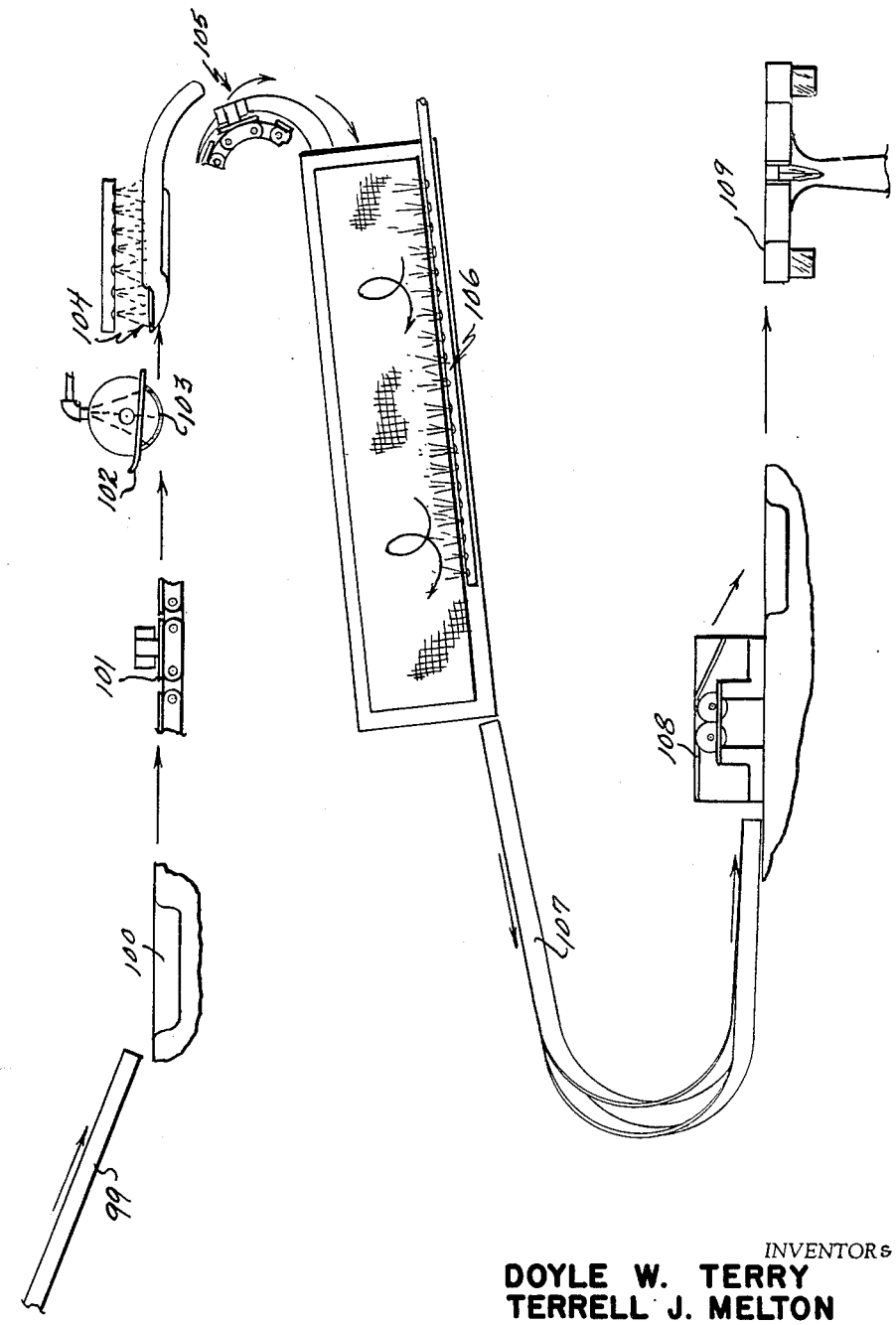

United States Patent Office 2,700,793
Patented Feb. 1, 1955

2,700,793

PROCESS FOR CLEANING POULTRY GIZZARDS

Doyle W. Terry and Terrell J. Melton, Athens, Ga.

Application September 9, 1953, Serial No. 379,119

13 Claims. (Cl. 17—45)

The present invention relates broadly to poultry packing and particularly to packing of chickens.

More specifically, the present invention relates to a method for cutting and cleaning gizzards of poultry, particularly those of chickens, and utilizing means which automatically cut gizzards, then subject the gizzards to an initial washing, following which the gizzards are opened and spread while being subjected to a second washing preferably under the influence of pressurized water jets. Thereafter the gizzards as spread and partially cleaned are passed into a third wash or tumbling mechanism to complete the cleansing of the gizzards. The gizzards thereafter are conveyed to an inspecting and deskinning station and thereafter to a packaging station. The apparatus is claimed in my copending application, Serial No. 379,122, filed September 9, 1953 and entitled Apparatus and Means for Cleaning Poultry Gizzards, a division of the present application.

In the poultry packing industry, there are a tremendous number of fowl which are processed each day and labor costs are a very important item. Devices and means have been used for automatically conveying the fowl to various stations where a sequence of operations are conducted such as deheading, plucking, cleaning and drawing, and final packing for shipment. There remains in the industry, however, a necessity for speeding the process of gizzard cleaning. This is a substantial need when it is considered that many thousands of fowl are processed each day. This has previously been unsatisfactorily effected by means of manual labor.

It is accordingly an object of the present invention to provide a method of rapidly and efficiently cutting and opening gizzards and subjecting them to a series of washing operations so that at the end of their travel, they are ready for immediate packaging and, after the process is initiated, no further manual labor is needed to complete the operation until they are discharged in a state for packing at the end of the steps of the process.

In order to practice the present invention, there is provided a conveyor system having a plurality of individual gizzard receiving cups and these cups are spaced apart in line with the direction of travel of the conveyor system. The gizzards, when placed in these cups, are subjected to a slitting action to slit the gizzards a predetermined distance through the thickness thereof. Initial washing means are applied to this rotary knife for cleansing and cooling the same during operation and for subjecting the gizzards to a first washing.

Following the slitting and initial washing of the gizzards, and still in line with the direction of movement of conveyor, there are combined spreading, depressing or retaining means adapted to be inserted in and spread the slit in the gizzard sufficiently to provide thorough cleansing thereof. At the same time each gizzard is passing under the retainer-spreader, a pressurized water spray is jetted against the cut made in the gizzard for a second cleaning operation.

The slit and spread gizzards, following the second washing operation, are dropped into a hopper which thereafter directs the partially cleaned gizzards to a washing tumbler beneath the conveyor section of the device and streams of fluid are convergedly directed into the tumbler which consists of an inner wire mesh whereby, on rotation of the wire mesh, the streams more thoroughly cleanse the gizzards. The tumbler is preferably angularly disposed with respect to the conveyor system to facilitate tumbling and discharge.

Separate sources of water supply are utilized, of which one is adapted to feed pressurized water to the cutter and to that section of the conveyor where spreading and jet cleansing of the gizzards takes place. The second supply of water is adapted to direct streams convergedly in the outer fixed tumbler through the moving inner wire mesh thereof.

The slitting means for the gizzard consists in a circular knife or saw which is operable electrically, and related means are provided in conjunction therewith for compressing and holding the gizzards in their individual cups during the slitting, spreading, and cleansing operation until discharged into the tumbler.

Accordingly, the present invention is directed primarily to a complete automatic method of slitting and cleaning gizzards involving a plurality of sequential operations in which the gizzards are subjected to multiple washings and thus placed in a condition for immediate packing.

The method of the present invention permits a substantial saving in time and labor costs in packaging and cleaning of gizzards.

Further objects and advantages of the present invention will be readily apparent from the following detailed description of an embodiment of the invention when taken together with the accompanying drawings in which:

Fig. 1 is a top plan view of the overall apparatus of the present invention;

Fig. 2 is a side elevational view of the apparatus of Fig. 1 taken from one side thereof;

Fig. 3 is a side elevational view of the apparatus of the invention on the opposite side with respect to Fig. 2 taken along lines 3—3 of Fig. 1;

Fig. 6 is a fragmentary enlarged side elevation view of a portion of the machine showing details of the cutting and spreading mechanism;

Fig. 7 is a perspective view of a portion of the conveyor of the apparatus showing in detail the formation of a gizzard containing cup;

Fig. 8 is an enlarged sectional view taken on the line 8—8 of Fig. 6;

Fig. 10 is a diagrammatic showing of the apparatus used in practicing the method.

In the various views shown in the drawings, like reference characters refer to like parts and the following specification is to be read and understood in this light.

Figure 4:
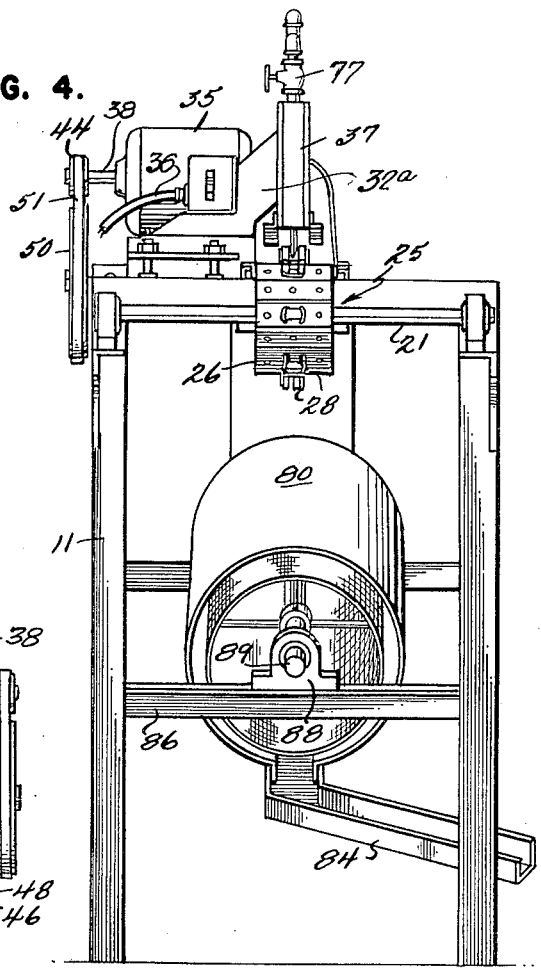
Fig. 4 is an end elevational view of the apparatus.

In the drawings, a table generally designated at 10, has spaced vertical legs or uprights 11 and laterally spaced table or top portions 12 and 13. The two portions 12 and 13 are spaced by a channel 14 which is open at the bottom and has laterally extending flanges at 15 which serve as a support for a conveyor chain as will be apparent hereinafter. Extending longitudinally under at least a portion of the table is a trough 16 which opens into the channel 14 and has a discharge chute 17 leading therefrom. The purpose of the trough 16 and discharge chute 17 is to carry off wash water.

Brackets 18 and 19 are affixed at each end of the table and by means of bearing blocks 20 rotatably journal shafts 21 and 22. Centrally located on shaft 21 are spaced sprocket wheels 23 and corresponding sprocket wheels 24 are secured on shaft 22. Entrained over the sprocket wheels 23 and 24, and extending longitudinally of the table, is a conveyor chain 25 constructed of a plurality of linked sections as shown in Figs. 2 and 7. The conveyor chain, generally designated 25 in Fig. 2, actually consists of two spaced link chains 25a and 25b as seen in Fig. 7, each of which cooperates with one pair of sprocket wheels 23 and 24 which are laterally spaced with respect to one another. Mounted on top of the conveyor chains 25a and 25b are a plurality of contiguously arranged plates 26 having spaced openings 27 therein.

Surmounted over the central opening 27 of various ones of the plates 26, are gizzard holding cups 28 consisting of a bracket member 29 secured to the plate 26 and held thereby are semi-circular laterally spaced members 30 and 31. Preferably the members 30 and 31 are formed in an oval shape so as to accommodate the normal shape of a chicken or other fowl gizzard as by partially confining the object against displacement during conveyance. The plates 26 ride on, and are supported by, flanges 15 and the chain portions 25a and 25b extend downwardly into the open channel.

Mounted above the table there is a bracket 32, suspended by means of bolts such as at 33 and by a hinge 34 which permits angular adjustment of the bracket 32 with respect to the table. The purpose of this angular adjustment is to permit adjusting the height of slitting means for the gizzard as will be apparent from the following description.

This bracket 32 supports an electric motor 35 having an electrical connection 36 for attaching to a suitable electrical power source (not shown). Spaced flanges 32a on bracket 32 support a circular shaped housing 37 which is open at the bottom. The shaft 38 of the motor 35 has secured thereon a circular cutting blade 39 which extends downwardly through the open bottom of the circular housing into proximity to the top of the conveyor chain 25, and the knife or saw blade 39 extends downwardly into the space between the half units 30 and 31 of the gizzard cups as can be seen from Fig. 6. On each side of the circular housing 37 there are guide and pressure plates 40, better seen in Fig. 6 and which are adjustably mounted thereon by means of screws at 41 and 42. The leading edge of the plates 40 are upturned as shown at 43.

The opposite end of shaft 38, as seen in Fig. 1, carries a belt pulley 44. A gear reduction mechanism, generally shown at 45, is mounted on a plate 46 secured adjacent one end of the table, and supported by means of legs such as shown at 47 and flanges 48. The gear reduction box or mechanism has a shaft 49 extending therefrom and has a gear wheel or pulley 50 secured thereon. A belt 51 is entrained over the pulley wheels 44 and 50 for driving the gear reduction mechanism from the motor 35 as desired. The take-off shaft 52 from the gear reduction mechanism 45, has a pulley 53 secured at one end and a bevel gear 54 at its other end. The shaft 22 has a bevel gear 55 which mates with, and coacts with, the bevel gear 54 so that upon actuation and rotation of the motor 35, the shaft 22 will be driven through belt 51, pulley 50, reduction means 45, shaft 52, bevel gear 54, and bevel gear 55. Thereupon the sprocket wheels 24 will drive the individual chain units 25a and 25b to thereby move the cups 28 longitudinally over the spaced table sections 12 and 13 to convey gizzards to the circular knife or saw 39. In so doing, the gizzards will first be contacted by the upturned ends 43 of the guide and pressure plates 40 and while being progressively increasingly pressed and confined will be slit to between one-half and two-thirds through the thickness thereof by the circular blade 39. Slitting in this manner avoids rupture and bruising of walls of the gizzard and uneven separation because there is thus no forced jamming of the gizzard against the confining means or any other retaining means. It is to be understood that the word "slitting" hereinafter refers to rotary knifing or rotary sawing, as opposed to fixed cutting or cleaving.

Spaced behind the circular blade 39 in the direction of movement of the conveyor 25, there is a combined retainer and spreader unit generally indicated at 56. This unit includes a centrally disposed retaining member 57 which fits in between the two half units 30 and 31 forming the gizzard cups 28 and is pointed at its forward end. This central retaining member 57 has spaced on either side thereof and in a higher plane than the lower edge thereof spreader blades 58 and 59 which also are preferably pointed at their leading edges. The purpose of the member 56 including the central retaining member 57, and spreader blades 58 and 59, is to spread and simultaneously compress the gizzards after the initial slitting by the circular blade 39 as they pass along in their line of travel over the table so that they are spread and opened in the cups for reasons to appear hereinafter. The spreader blades 58 and 59, as shown in Fig. 6, are curved at their rear ends, as at 60, and extend around a portion of the bend where the conveyor chain is entrained over the sprocket wheels 24 for maintaining the cut and open gizzards in position in the gizzard cups.

Aft of this spreader mechanism is a trough 61 into which the slit, opened, and spread gizzards are discharged as the conveyor chain and, accordingly, the gizzard cups 28 pass around the sprocket wheel on their return path under the table as shown at 62.

The spreader blades 58 and 59, as also the central retaining member 57, are mounted on top of the table by means of posts 63 and 64 together with bolts 65 operable in slots 66 so that the various members can be adjusted as to height with respect to one another, and also with respect to the gizzard cups 28 passing thereunder. The upper ends of posts 63 and 64 support, by means of brackets 67, a pipe extending longitudinally above the spreader unit 56. The brackets 67 are vertically adjustable and can be secured by any known means such as generally designated at 69 which may consist of set screws or the like. A shield 70 is mounted over and surrounds the top and sides of the pipe 68. The rear end of pipe 68 is closed by a cap 71.

The under side of pipe 68 has a plurality of longitudinally spaced openings 72 therein. These openings 72 extend along directly above the spreader unit 56. They are adapted for spraying jets of pressurized water down onto the spreader unit for cleansing thereof and also of the gizzards which have been slit, spread and retained with opposed portions of the muscular walls of the gizzard and the opposed portions of the horny inner lining exposed. An inlet pipe 73 is connected into pipe 68 and extends to a suitable source of water supply under pressure. A valve generally designated 74 is for the purpose of controlling the flow and pressure of the water in pipe 68 from the inlet pipe 73. A water spray is inserted in the top of circular housing 37, as shown at 75, and is interconnected to pipe 68 by means of a pipe 76 which is controlled by a valve 77 as shown in Fig. 3. The purpose of the spray 75 is to permit a spray of water to wash and cool blade 39, and at the same time, to initially cleanse gizzards passing beneath the blade prior to reaching the second washing stage or operation under the pipe 68 after the gizzards have been spread by means of the spreader unit 56.

Positioned aft of the spreader unit 56 and in the area where the conveyor chain starts to circle around the sprocket 24, there is a stationary curved ejector blade 78 secured to the mechanism and which has a curved leading edge which is positioned in proximity to the base of the gizzard cups 28 and adapted to pass between the two half units 30 and 31. As a gizzard cup 28 passes under ejector blade 78, the ejector blade will forcibly eject the gizzard from the gizzard cup. During a greater portion of movement of the individual cups around sprocket 24, the gizzards will be maintained in position in the cups by virtue of the curved ends 60 of the spreader unit.

Figure 5:
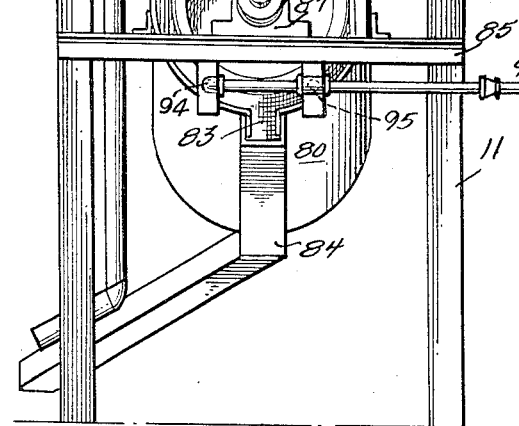
Fig. 5 is an end elevational view of the opposite end with respect to Fig. 4.

Positioned below the table there is a tumbling and washing device 79 which consists of a fixed exterior drum 80 secured to the frame as by angle irons 81 fixed to leg 11. If desired, they can also be secured to longitudinal stringer members 82 in any known manner. This fixed drum, as shown in Fig. 5, has a longitudinally extending slot in the base thereof shown at 83 which empties into a trough 84 for discharging water as will appear later. End cross braces 85 and 86 are secured on the upright posts 11 and mount journal bearings 87 and 88, respectively. It is to be noted that the end cross brace 85 is higher on the legs 11 than is the end brace 86. The journal bearings 87 and 88 rotatably support a shaft 89 and this is inclined as shown in Fig. 3 of the drawings. Mounted on the shaft 89 are a plurality of spiders or webs 90 which support, at their outer edges or ends, a wire mesh drum 91 of cylindrical configuration which, as shown in Fig. 3, is mounted internally of the fixed drum 80. The wire mesh interior drum 91 can be rotated with respect to fixed drum 80 by means of a pulley 92 mounted on the upper end of shaft 89 and a belt 93 entrained over pulley 92 and interconnected with pulley 53 shown in Fig. 1. It will accordingly be seen that upon rotation of motor 35, the shaft 89 and the wire mesh tumbler 91 will be rotated internally of the fixed drum 80 through the speed reduction mechanism 45.

Arranged internally of fixed drum 80, and between the inner wall thereof and the mesh drum 91, and extending substantially parallel therewith, are two spaced longitudinally extending pipes 94 and 95 which are closed at one end and at the upper other end thereof are secured into and connected into a lead in pipe 96 which is attached to a suitable supply of water. The pipes have a plurality of holes 97 extending therealong. The holes 97 on the two pipes 94 and 95 are so arranged as to direct converging streams of water into and through the rotatable wire mesh drum 91 so as to permit washing of the gizzards being tumbled through the tumbling device. This effects a third washing of the slit and spread and partially cleaned gizzards. The gizzards, after passing through the tumbler, are discharged at the lower discharge end of the device and thereafter can be conveyed by any desired means to packaging devices.

It is to be noted that the tumbling mechanism is angularly disposed with respect to the conveyor system and two separate sources of water supply are provided. The first source of water supply is adapted to feed pressurized water to the circular blade and to that section of the conveyor where the gizzards are spread by the spreader. The second supply of water directs converging streams in the fixed drum of the tumbler through the moving wire mesh drum therein.

Pans 98 are formed in table parts 12 and 13 into which gizzards taken from the fowl are discharged by conveyors or chutes from the drawing station.

The construction of the apparatus which can be utilized in the present process will be apparent from the foregoing detailed description of an embodiment thereof, although it is to be understood that other apparatus and modifications of minor details can be readily made by those skilled in the art to which the present invention pertains to practise the invention without departing from the scope and spirit of the present invention.

In operation, the apparatus and the method function as follows: Gizzards which have been removed from dressed and drawn fowl are placed by operators into the gizzard cups 28 to partially confine the gizzards on the conveyor 25 which is travelling in the direction shown by the arrows of Figures 2 and 3. As these gizzard cups are moved along carrying the gizzards with them, the latter are first contacted by the upturned end 43 of the guide and pressure plates 40 which tend to compress them slightly and press them firmly into the individual gizzard cups 28. They are then contacted by the blade 39 which is rotating at a relatively high rate of speed. The blade passes between the two half units 30 and 31 of the gizzard cups 28 and slits each gizzard between one-half and two-thirds of its depth. The depth of slitting can be controlled by vertical adjustment of shaft 38 carrying the knife blade 39. After this slitting operation, they are then passed to the retaining and spreader unit, but before reaching this position, they are given an initial washing due to the spray 75 which not only serves as the initial gizzard washing means but also serves to cool and wash the blade 39.

Upon reaching the retaining spreader unit 56 they are spread, and at the same, compressed into the cups 28. During their entire travel through this section, the gizzards, while being spread, are subjected to a spray of water through the holes or openings 72 in pipe 68 which constitutes a second washing of the gizzards. The gizzards are then discharged or forcibly ejected from the individual gizzard cups 82 by means of the curved ejector blade 78 and thereupon dropped into the hopper 61 which discharges into the tumbler and washing device generally shown at 79.

Rotation of the wire mesh drum 91, as set forth hereinbefore, causes the gizzards, which have been slit and initially washed, spread and given a second washing, to be tumbled downwardly along the inclined tumbler from the entrance end to the discharge end. During this tumbling operation, the gizzards are subjected to a third washing by means of jets or streams of water convergedly spraying into the wire mesh drum from openings 97 in pipes 95 and 94. Following this third washing, the thoroughly cleaned gizzards are discharged from the drum and then carried or conveyed to packaging stations for placing in any desired packages and to then be replaced in the fowl prior to final packing thereof.

Figure 9:
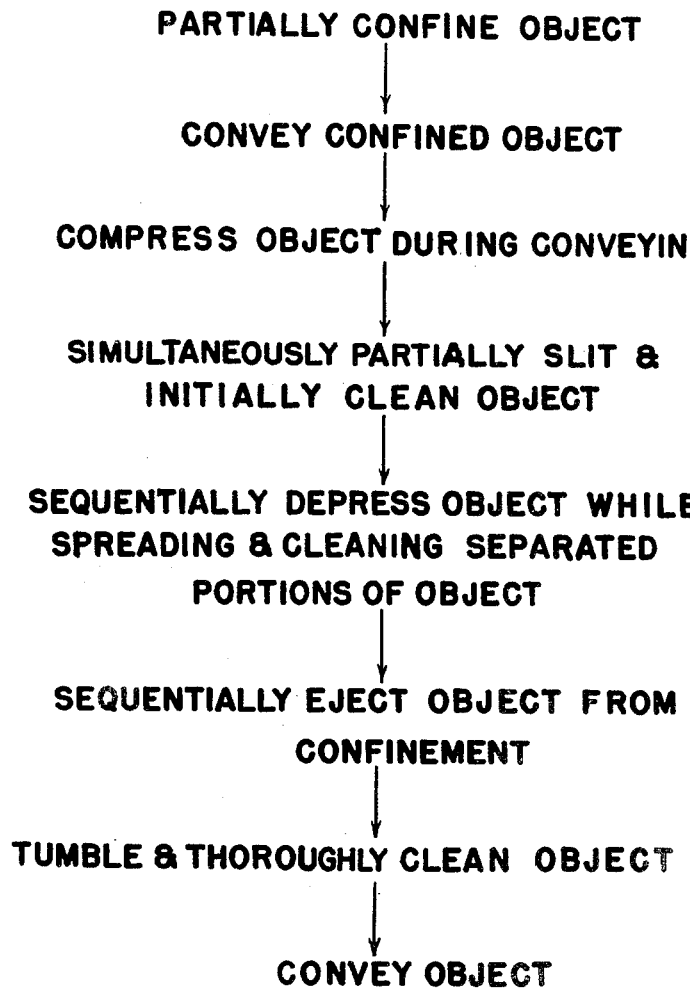
Fig. 9 is a flow sheet setting forth the sequential steps of the invention.

In Fig. 9, there is set forth a flow diagram showing the sequence of steps involved in the present process. The gizzards are first conveyed from the drawing station to the table of the cutting and cleaning apparatus. Next the gizzards are placed in the holders or retainers and conveyed to a compressing station where they are compressed in the retainers. While still compressed they are initially slit and given an initial washing. Subsequently they are spread while being subjected to a second washing for cleaning after which they are ejected from the retainers and tumbled while undergoing a third washing. The washed and cleaned gizzards are then conveyed to a skinning and inspection station where they are skinned and inspected and thereafter packaged.

Fig. 10 shows diagrammatically the process as carried out by the apparatus of the invention as set forth in the preceding paragraphs. The conveyor from the drawing station is shown at 99 which feeds the gizzards into pans 100 from where they are taken and placed in retaining cups 101 on an endless conveyor. The cups, with gizzards retained therein, move with the conveyor to a pressure applying means 102 where the gizzards are compressed. The gizzards are then slit and simultaneously washed by means at 103 while being maintained compressed. Next retainer and spreader means 104 retain and spread the gizzards while the gizzards are subjected to a second washing. The gizzards are then ejected by an ejector at 105 and drop into a tumbler and washer at 106 where they are tumbled while being subjected to a third and final washing. After discharge from the tumbler and washer 106 they are conveyed at 107 to an inspection and skinning station and apparatus 108 from which they pass to be packaged at 109.

The process of the present invention will be clearly understood from the foregoing description and it will be apparent that minor changes can be effected therein without departing from the scope and spirit thereof. The gizzards are passed through a series of sequential steps and stages of treatment including, among others, slitting, and spreading to insure thorough cleansing and tumbled through a combined tumbler and washing apparatus. During the various stages, the gizzards are subjected to three separate washings and accordingly are in condition for inspection, skinning and packaging.

We claim:

1. A method of preparing poultry gizzards and the like, including: Partially confining each gizzard by exteriorly engaging at least one wall thereof to hold the gizzard upright; simultaneously slitting the partially confined gizzard from outside in to separate both the opposed muscular walls and the portions of the inner lining thereof.

2. A method of preparing poultry gizzards and the like comprising: Conveying gizzards along a course while partially confining each gizzard to the path defined by the course; simultaneously slitting the partially confined gizzard from outside in, thereby to separate both the opposed muscular walls and the adherent inner lining of the confined gizzard.

3. A method of preparing poultry gizzards and the like, comprising slitting a gizzard from outside in, thereby to separate both the opposed muscular walls and portions of the adhering inner lining thereof and sequentially spreading slit portions of the slit gizzard to expose the gizzard interior for cleaning.

4. The method according to claim 3 in which spreading is effected sequentially of the slitting by compressibly engaging the gizzard at the vertex of slit portions thereof and concurrently forcibly laying aside walls of the gizzard as by initially plowing therebetween.

5. The method according to claim 3 further including pressure fluid cleaning of the interior of the gizzard concurrently as the walls and inner lining of the gizzard are spread apart.

6. The process according to claim 4 in which portions of the gizzard which are spread apart as by plowing are sequentially held down and apart for cleaning.

7. A method of preparing poultry gizzards and the like including partially confining each gizzard by engaging the exterior of at least one wall thereof to hold the gizzard upright; simultaneously slitting the partially confined gizzard from outside in, to separate both the opposed muscular walls and opposed portions of the inner lining thereof; and sequentially spreading slit portions of the partially confined gizzard, thereby exposing the gizzard interior for cleaning.

8. In a method of preparing poultry gizzards, the steps including: Conveying each gizzard along a course while partially confining each gizzard; sequentially initially partially slitting the muscular walls and adhering inner membranous sac of the confined gizzard from outside in; sequentially spreading the walls and adhering sac of the gizzard, thereby exposing the interior of the gizzard, while simultaneously cleaning the exposed interior of the partially confined gizzard.

9. A method of preparing poultry gizzards and like objects comprising: Conveying gizzards along a course while partially confining each gizzard to a path defined by the course; simultaneously slitting each partially confined gizzard along the course from outside in, thereby separating opposed muscular walls and opposed portions of the adherent inner-lining of each gizzard; sequentially forcibly ejecting the gizzard from confinement along the course.

10. The method according to claim 9 including separately tumbling and simultaneously cleaning as by impacting fluid against the tumbling gizzards, sequentially with the steps of slitting, and ejecting the gizzards from confinement along the course.

11. The method according to claim 9 further comprising spreading opposed walls and opposed portions of the adhering inner lining of the gizzards sequentially with slitting the gizzard thereby to expose the gizzard interior and simultaneously cleaning the exposed interior of the gizzard as by impacting fluid under pressure substantially against the vertex and adjacent exposed areas of slit portions of the gizzard.

12. The method according to claim 11 including separately tumbling and simultaneously cleaning gizzards as by impacting fluid under pressure against the tumbling gizzards, sequentially with the steps of slitting and ejecting the gizzards from confinement along the course.

13. The method according to claim 1 in which the gizzard is compressed while partially confined and during slitting.

References Cited in the file of this patent

UNITED STATES PATENTS

| | | |
|---|---|---|
| 2,331,855 | Vucassovich | Oct. 12, 1943 |
| 2,455,675 | Hawk | Dec. 7, 1948 |
| 2,630,599 | Grant et al. | Mar. 10, 1953 |
| 2,641,020 | Clemens et al. | June 9, 1953 |
| 2,657,424 | Biddinger et al. | Nov. 3, 1953 |